United States Patent
Suparschi et al.

(10) Patent No.: US 6,765,472 B2
(45) Date of Patent: Jul. 20, 2004

(54) SECURITY SYSTEM FOR A MOTOR VEHICLE OPENING LEAF EQUIPPED WITH SWITCHES

(75) Inventors: Bogdan Suparschi, Troy, MI (US); Michel Eychenne, Savigny le Temple (FR)

(73) Assignee: Valeo Securite Habitacle, Creteil (FR)

( * ) Notice: Subject to any disclaimer, the term of this patent is extended or adjusted under 35 U.S.C. 154(b) by 468 days.

(21) Appl. No.: 09/739,303

(22) Filed: Dec. 19, 2000

(65) Prior Publication Data

US 2001/0004233 A1 Jun. 21, 2001

(30) Foreign Application Priority Data

Dec. 21, 1999 (FR) ............................................. 99 16183

(51) Int. Cl.⁷ ........................... H04Q 9/00; G05B 19/00
(52) U.S. Cl. ................... 340/5.62; 340/5.72; 340/5.62; 340/5.61; 340/5.64; 340/10.1; 340/5.63; 340/825.69
(58) Field of Search .............................. 340/5.72, 5.62, 340/5.61, 5.63, 5.64, 825.72, 825.69, 10.31, 547; 335/153, 136, 160; 200/18, 42.01, 50.33

(56) References Cited

U.S. PATENT DOCUMENTS 4,897,644 A * 1/1990 Hirano ................... 340/825.31
5,983,347 A * 11/1999 Brinkmeyer et al. ........ 713/200
6,011,320 A * 1/2000 Miyamoto et al. ......... 307/10.2
6,072,403 A * 6/2000 Iwasaki et al. ............. 340/5.72
6,459,373 B1 * 10/2002 Edwards ..................... 340/547
6,538,559 B1 * 3/2003 Okada ........................ 340/5.72
6,556,125 B1 * 4/2003 Rohrl ......................... 340/5.62
6,577,228 B1 * 6/2003 Tsuchida et al. ........... 340/5.72

FOREIGN PATENT DOCUMENTS

| DE | 19633894 | 2/1998 |
| DE | 19805659 | 3/1999 |
| EP | 0916789 | 5/1999 |
| EP | 0955431 | 11/1999 |

* cited by examiner

*Primary Examiner*—Michael Horabik
*Assistant Examiner*—Vernal Brown
(74) *Attorney, Agent, or Firm*—Liniak, Berenato & White

(57) ABSTRACT

A security system for a motor vehicle opening leaf is provided. The security system includes a lock for maintaining an opening leaf in a closed position, a handle for operating the lock having a pivotal mobile member for grasping and a fixed support, and an interrogation device. The interrogation device triggers interrogation for authorization to permit movement of the bodywork panel between the closed position and an open position. The interrogation device includes an antenna and first and second switches built into the handle for activating an unlocking interrogation (Id) and a locking interrogation (Iv) by movement of the pivotal mobile member of the handle relative to the fixed support without requiring other mechanical actuation.

16 Claims, 8 Drawing Sheets

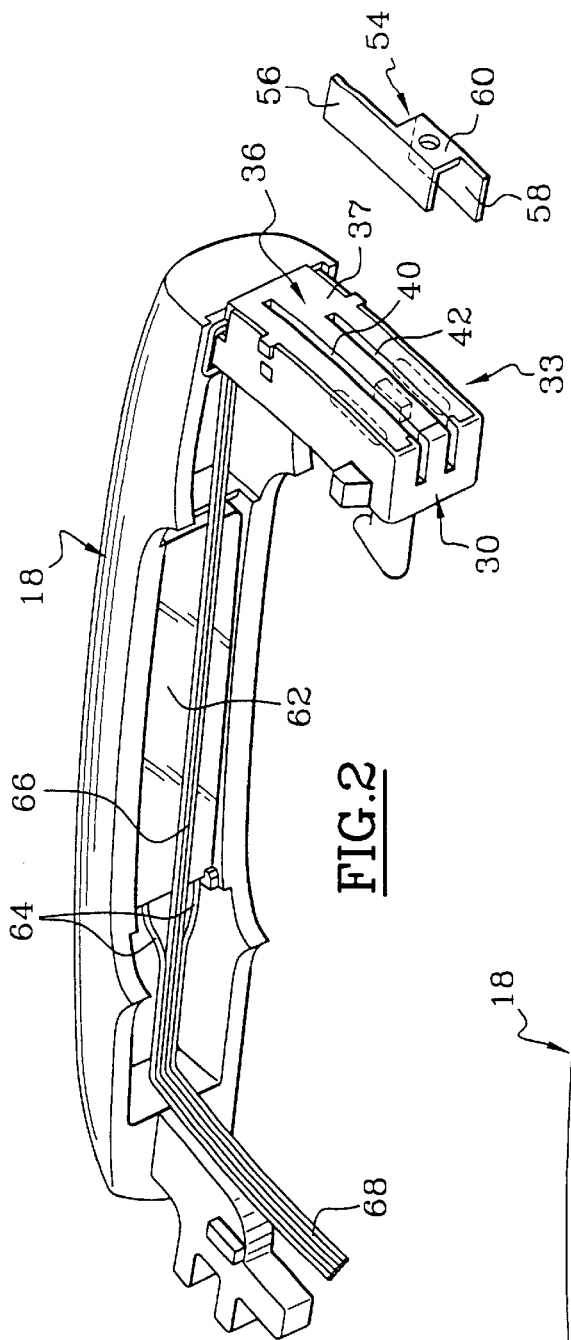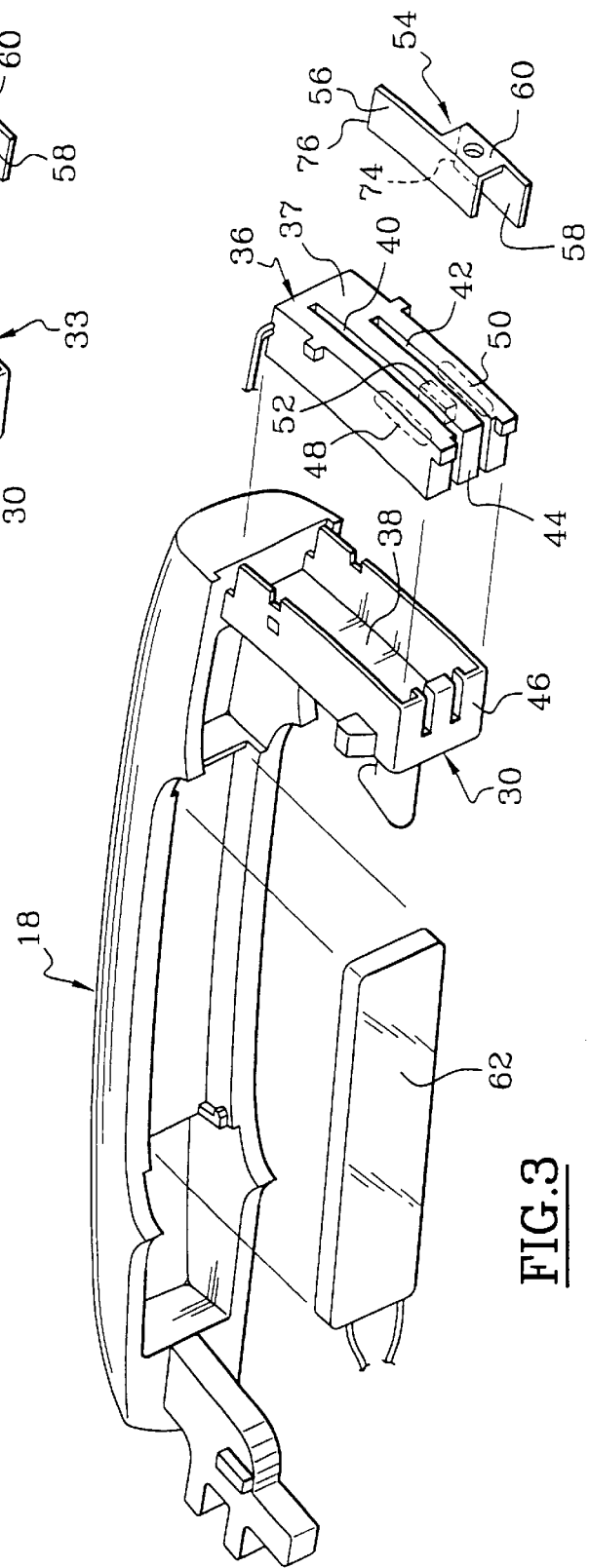

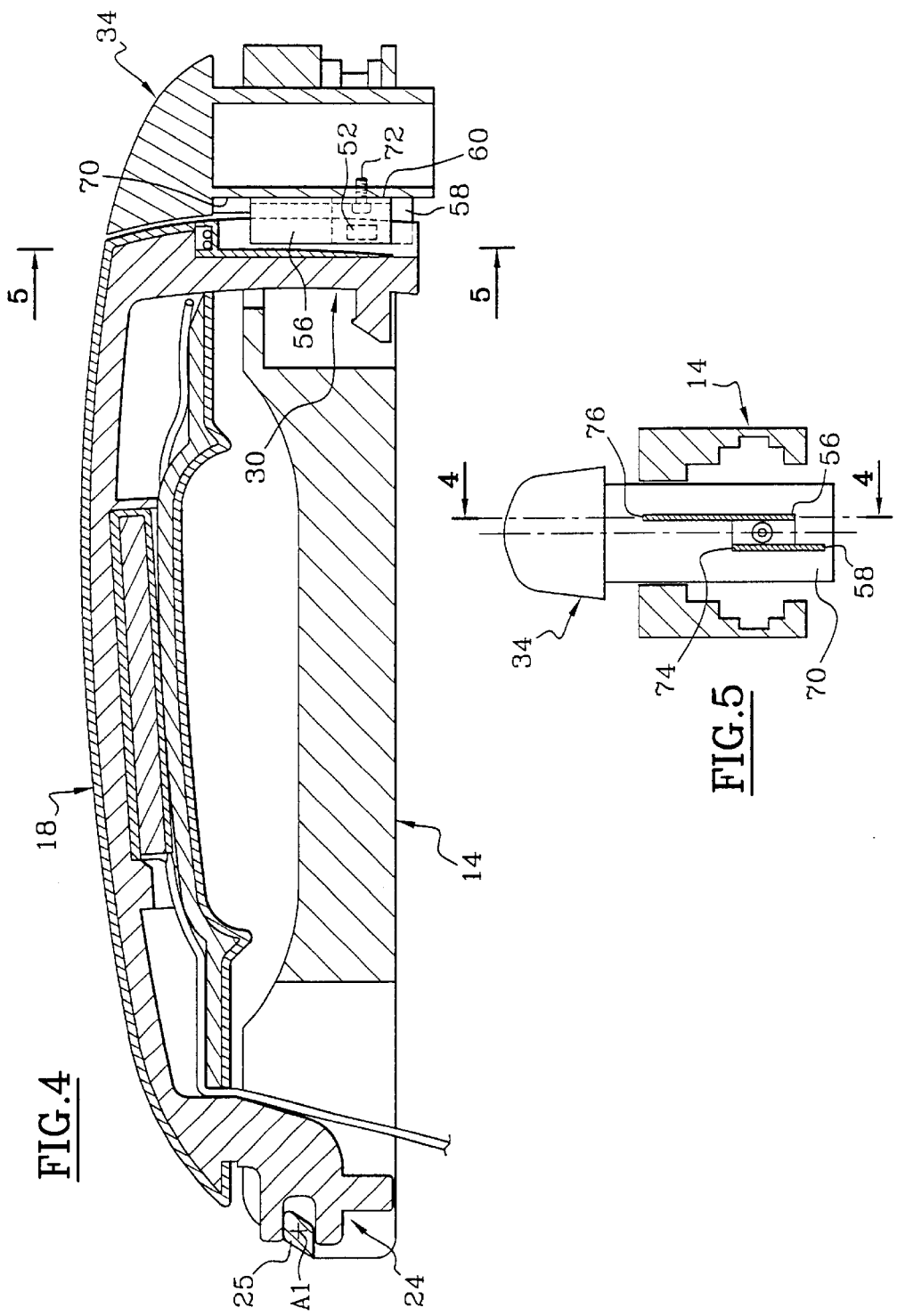

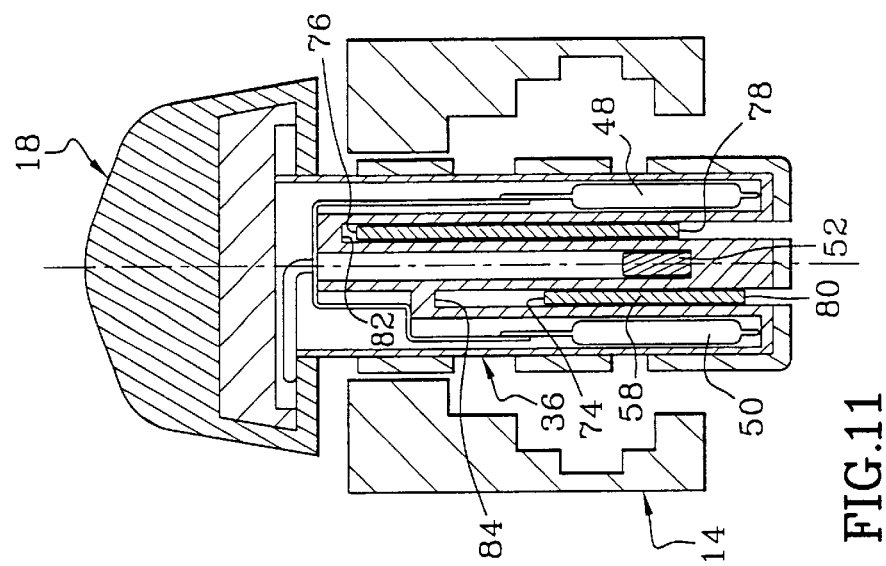
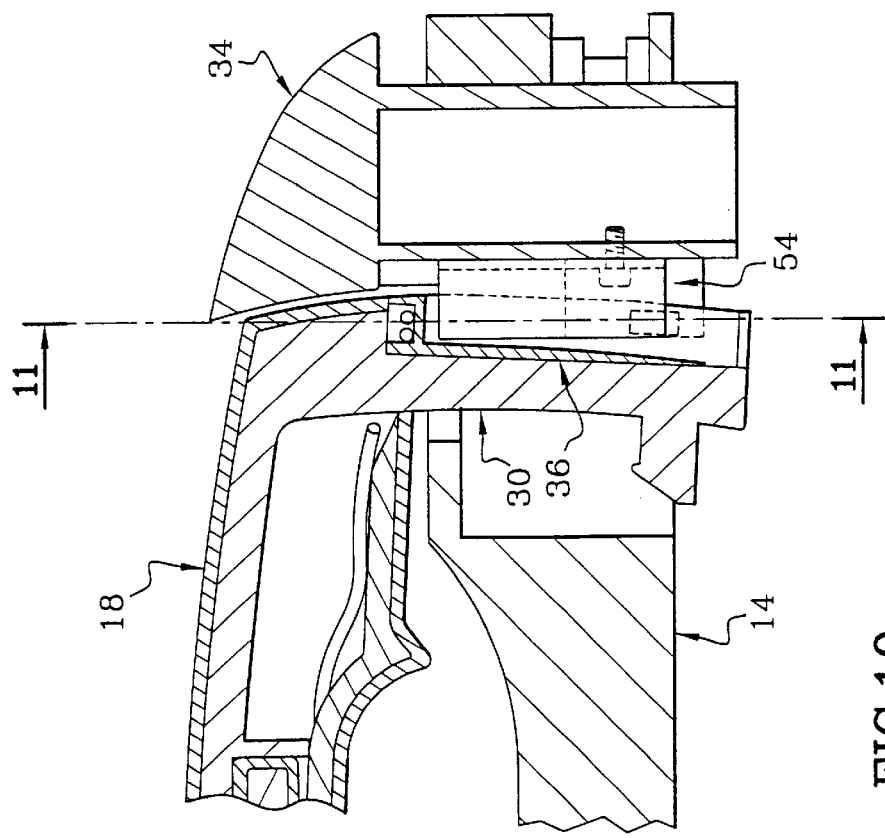

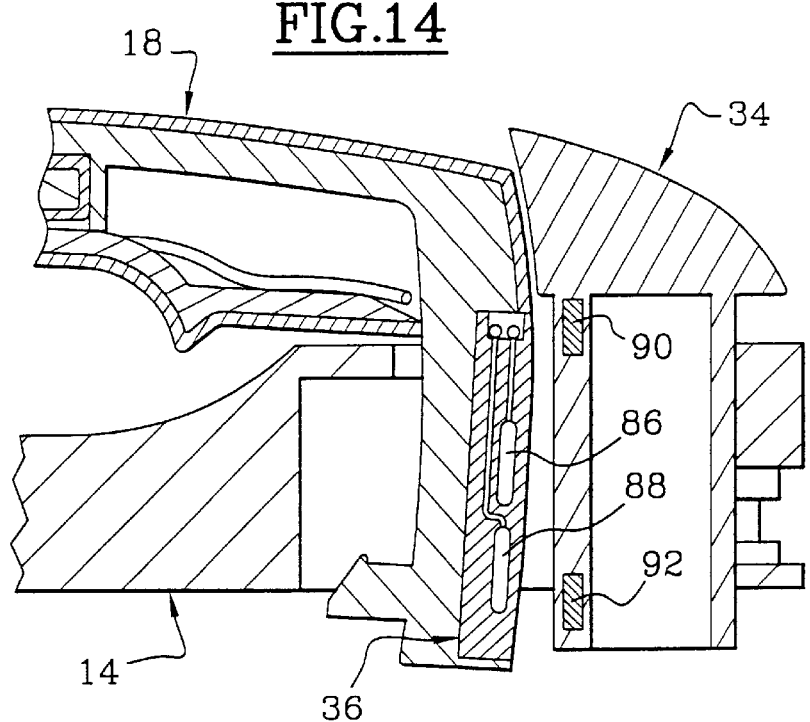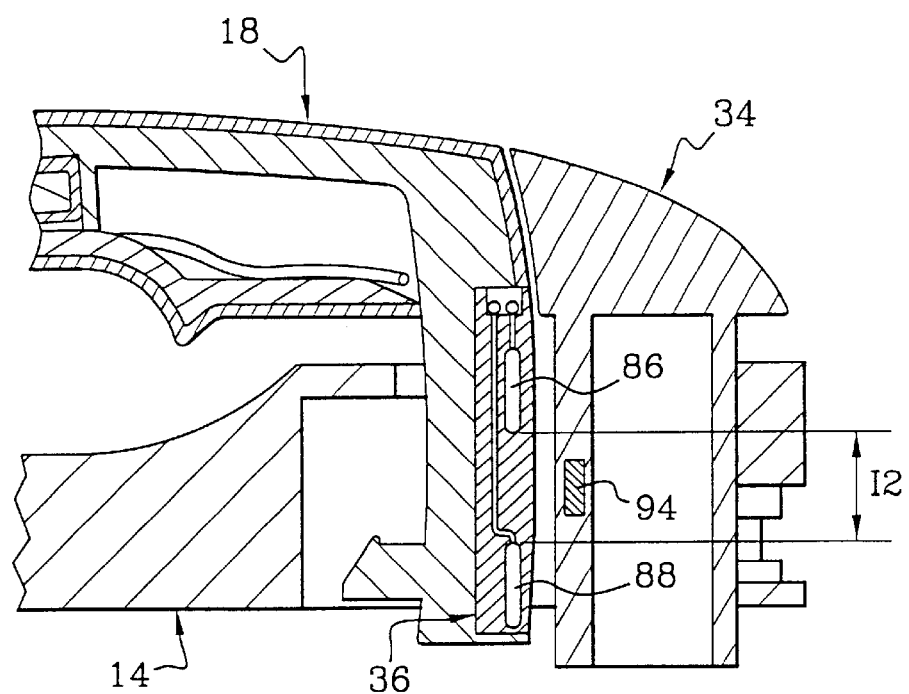

SECURITY SYSTEM FOR A MOTOR VEHICLE OPENING LEAF EQUIPPED WITH SWITCHES

BACKGROUND OF THE INVENTION

The invention relates to a security system for a motor vehicle opening leaf.

The invention relates more particularly to a security system for a motor vehicle opening leaf, of the "hands-free" type in which the opening leaf is kept in the closed position by a lock which is operated via a handle arranged on the external face of a bodywork panel of the opening leaf, of the type in which the handle comprises a fixed support and a pivoting mobile member for grasping, of the type in which an interrogation device is provided to trigger interrogation for authorization to open or close the vehicle, of the type in which the interrogation device comprises an antenna and comprises switches built into the handle, and of the type in which unlocking interrogation and locking interrogation are brought about by action on two corresponding switches via the handle.

In a known way, to check whether the user actuating the handle is authorized to open the door to the vehicle, the security system determines whether the user is wearing or carrying an appropriate security code, for example in the form of a badge equipped with an electronic key. To do that, the vehicle emits a signal, via an antenna, which interrogates the badge and determines whether the code conforms.

This operation is known as the unlocking interrogation. A similar procedure is carried out for closing the door, through a so-called locking interrogation operation.

For this unlocking or locking interrogation not to be emitted constantly, particularly with a view to saving the vehicle battery, it needs to be triggered at the appropriate time.

Security systems comprising devices for triggering unlocking or locking interrogation with a view to opening or closing the door of a vehicle are already known.

In general, the door handle comprises switching means which are manually actuated by the user, particularly by means of a button. For example, before opening the door, the user presses a button located on the door handle and which brings about unlocking interrogation. Likewise, having closed the door, the user presses a button located on the handle, which brings about locking interrogation.

There is also known, through patent DE-C1-198.05.659, a door handle in which the fixed support comprises a switch of the reed switch type. When the moving member of the handle for grasping, which carries a magnet, pivots outward, the reed switch is no longer influenced by the magnetic field of the magnet, and this causes switching and unlocking interrogation.

The locking interrogation is triggered in the conventional way by pressing a button located on the mobile member of the handle for grasping.

This type of device is not entirely satisfactory because it is still necessary to press on a button in order to bring about the unlocking interrogation.

In addition, the system comprises two electronic modules, one arranged on the mobile member of the handle for grasping and the other on the fixed support, and this makes the wiring operations more complicated and increases the cost of manufacture.

The object of the invention is, most particularly, to provide a security system which is simpler in design, less expensive and more reliable.

SUMMARY OF THE INVENTION

To this end, the invention proposes a security system of the type described previously, wherein the two interrogations, for locking and for unlocking, are brought about by two switches with no mechanical actuation, the triggering of which is brought about solely by the relative movement of the pivoting mobile member for grasping with respect to the fixed support of the handle.

According to other features of the invention each switch comprises at least one magnet and at least one sensitive element of the reed switch type of Hall effect type which switches when the magnet occupies a determined position with respect to the sensitive element.

According to another feature of the invention, each switch comprises a magnet and a sensitive element, both borne by the mobile member for grasping or, respectively, by the fixed support, and the fixed support or the mobile member for grasping, respectively, bears at least one metal screen associated with each switch so that each metal screen can be inserted between the magnet and the corresponding sensitive element so as to cause one or other of the sensitive elements to switch according to the relative movement of the mobile member for grasping, so as to trigger interrogation for unlocking or for locking.

According to still another feature of the invention, the mobile member of the handle for grasping, or respectively, the fixed support bears a first and a second sensitive element and a first and a second magnet, the fixed support of the handle or, respectively, the mobile member for grasping, bears a first and a second screen which are designed to be inserted selectively between an associated sensitive element and an associated magnet, a third screen being provided to be inserted between the first and second magnets so as to prevent each magnet from being able to act on a sensitive element not associated with it, so that (a) in a rest position, a screen is inserted between each magnet and its associated sensitive element; (b) in the unlocking interrogation position, the first screen is no longer inserted between the first magnet and the first sensitive element, which causes the first sensitive element to switch; and (c) in the locking interrogation position, the second screen is no longer inserted between the second magnet and the second sensitive element, which causes the second sensitive element to switch.

According to a further feature of the invention, the mobile member of the handle for grasping or, respectively, the fixed support, bears a first and a second sensitive element which are arranged one on each side of a common magnet, and the fixed support of the handle or, respectively, the mobile member for grasping, bears a first and a second parallel screen, each of which is designed to be inserted selectively between an associated sensitive element, and the common magnet so that: (a) in the rest position, each screen is inserted between the common magnet and the associated sensitive element; (b) in the unlocking interrogation position the second screen is no longer inserted between the common magnet and the second sensitive element, which causes the second sensitive element to switch; and in the locking interrogation position, the first screen is no longer inserted between the common magnet and the first sensitive element, which causes the first sensitive element to switch.

According to still a further feature of the invention, the first and second sensitive elements are arranged facing one another in the path of the mobile member for grasping, and the first and the second screens are offset along this path.

According to another feature of the invention, the sensitive elements and the magnet are incorporated into one and the same switching module.

According to another feature of the invention, the module comprises two slots, each of which extends between the magnet and the associated sensitive element so as to allow the screens to be inserted selectively between the magnet and one or other of the sensitive elements.

According to another feature of the invention, the magnet is borne by the fixed support or by the mobile member of the handle for grasping, and the sensitive element is borne by the mobile member of the handle for grasping or, respectively, by the fixed support.

According to another feature of the invention, the fixed support of the handle or, respectively, the mobile member for grasping, bears a first and a second magnet which are separated by a gap in the path of the mobile member for grasping, and the mobile member of the handle for grasping, or, respectively, the fixed support bears a first and a second sensitive element which are offset along said path, so that: (a) in the rest position, the two sensitive elements are located facing the gap and do not switch; (b) in the unlocking interrogation position, the first sensitive element is located facing the first magnet where it switches, and the'second sensitive element is located facing the gap; and (c) in the locking interrogation position, the first sensitive element is located facing the gap and the second sensitive element is located facing the second magnet where it switches.

According to other features of the invention, the fixed support of the handle or, respectively, the mobile member for grasping, bears a single magnet common to the two switches and the mobile member of the handle for grasping or, respectively, the fixed support, bears a first and a second sensitive element which are separated by a gap along the path of the mobile member for grasping, so that: (a) in the rest position, the common magnet is located facing the gap and the sensitive elements do not switch; (b) in the unlocking interrogation position, the common magnet is located facing the second sensitive element which switches; and (c) in the locking interrogation position, the common magnet is located facing the first sensitive element which switches.

According to another feature of the invention, the mobile member for grasping is mounted so that it can pivot outward along an unlocking travel and inward along a locking travel.

According to still another feature of the invention, the antenna is incorporated into the mobile member of the handle for grasping.

According to still a further feature of the invention, the antenna and the two sensitive elements are borne by the mobile member for grasping or by the fixed support of the handle, and a wiring harness is common to the antenna and to the two sensitive elements.

BRIEF DESCRIPTION OF THE DRAWINGS

Other features and advantages of the invention will become apparent when reading the detailed description which follows, for an understanding of which reference will be made to the appended drawings in which:

FIG. 2 is a perspective view which depicts the mobile member for grasping of the security system of the invention, in conjunction with the fixed screen;

FIG. 3 is an exploded perspective view depicting the main components forming the mobile member for grasping in FIG. 2, in conjunction with the fixed screens;

FIG. 4 is a view in section on the plane of section 4—4 of FIG. 5, which depicts the mobile member for grasping of FIG. 2 in the rest position;

FIG. 5 is a view in section on the plane of section 5—5 of FIG. 4, depicting the endpiece of the handle and the fixed screens of FIG. 2;

FIG. 10 is a view similar to that of FIG. 6 depicting the mobile member for grasping in the locking interrogation position;

FIG. 11 is a view similar to that of FIG. 7 depicting the switching device on the plane of section 11—11 of FIG. 10;

FIG. 14 view similar to that of FIG. 12 depicting the switching device in the locking interrogation position; and FIG. 15 is a view similar to that of FIG. 12 depicting a third embodiment of the invention in which the switching device comprises two sensitive elements and just one fixed magnet, and which is depicted in the rest position.

DETAILED DESCRIPTION OF PREFERRED EMBODIMENTS AND METHODS OF THE INVENTION

In the remainder of the description, the overall direction, in this instance roughly horizontal, of the mobile member 18 for grasping at rest and which is practically in the form of a longitudinal bar, will be defined arbitrarily as the longitudinal direction.

The plane perpendicular to the longitudinal direction will be termed the transverse plane.

Figure 1:
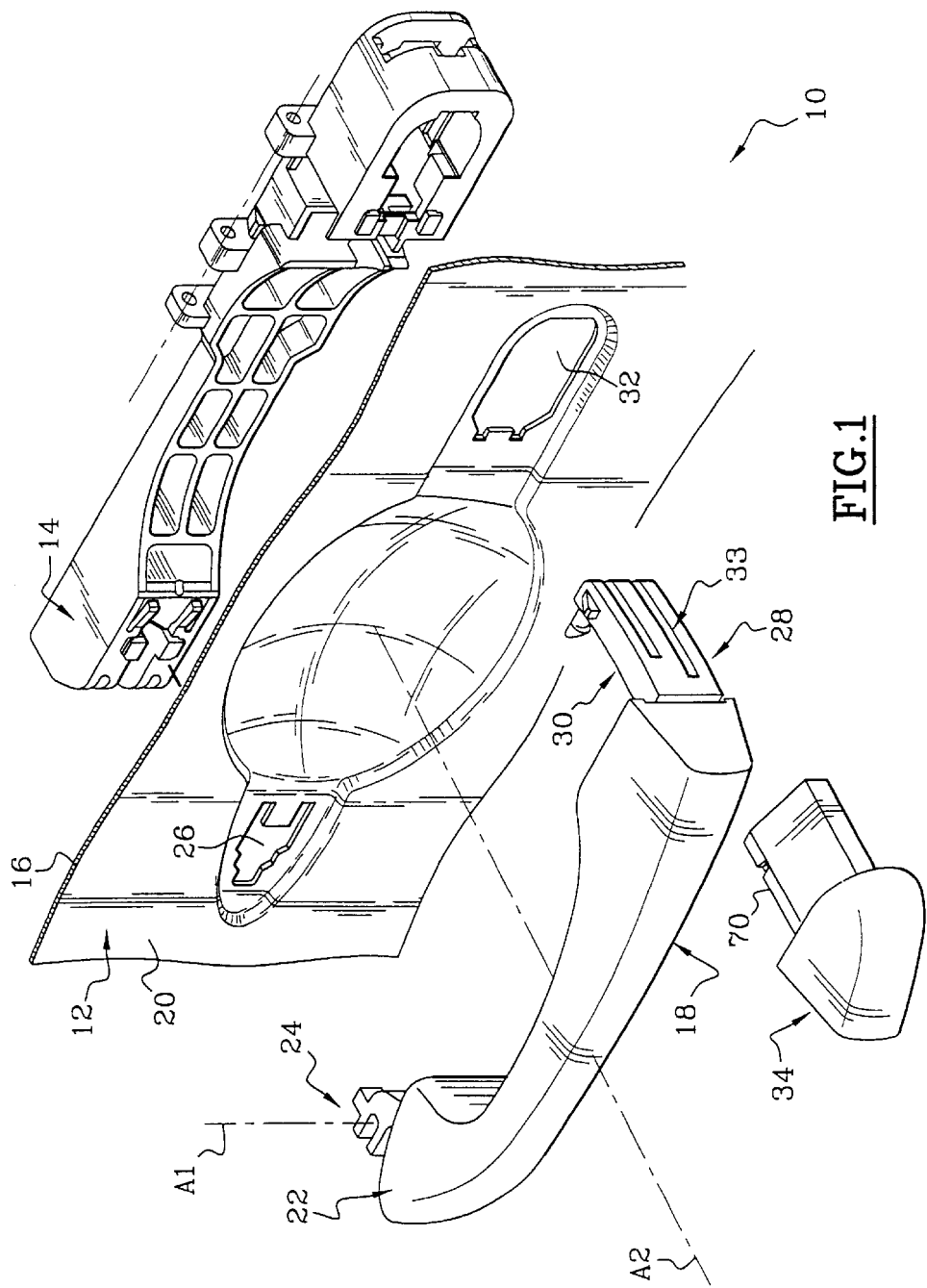
FIG. 1 is an exploded perspective view depicting the various components of a security system, for a motor vehicle opening leaf according to the preferred embodiment of the invention.

The side of the mobile member 18 for grasping which includes the axis A1 of articulation will be termed the rear side and the opposite side will be termed the front side. This back-to-front orientation corresponds roughly to an orientation from left to right in FIG. 1.

The left-hand side and the right-hand side of the handle will be defined with respect to FIG. 5 and will be equivalent to the left-hand and right-hand sides of this figure, about the plane parallel to the overall plane of the bodywork panel, and in a back-to-front orientation.

The direction practically perpendicular to the overall plane of the bodywork panel 12 will be termed the axial direction along the axis A2 for mounting and assembling the handle elements on the panel 12.

To articulate the mobile member 18 for grasping, its rear end 22 comprises a pull bar 24 intended to be engaged through a rear orifice 26 in the bodywork panel 12 so as to be mounted to rotate about a pivot 25 belonging to the support 14 (see FIG. 4).

The front end 28 of the mobile member 18 for grasping comprises a front leg 30 which extends axially inward through a front orifice 32 formed in the panel 12 so as to collaborate with a linkage (not depicted) connecting the mobile member 18 for grasping to an opening leaf mechanical lock.

In accordance with the teachings of the invention, according to the preferred embodiment of the invention, the front leg 30 comprises a switching device 33.

A handle endpiece 34 also extends axially inward through the front orifice 32 and is fixed to the longitudinal front end of the handle support 14.

A user can thus operate the mobile member 18 for grasping, by grasping hold of an essentially central part of the mobile member 18 and by pulling it axially outward, in a so-called unlocking travel, from a rest position Pr to a so-called unlocking interrogation position Pd. This operation causes a rotational movement of the mobile member 18 about the axis A1 in the counter clockwise direction when considering FIG. 4, until it reaches a stop (not depicted).

The user can also push the mobile member 18 for grasping axially inward, in a so-called locking travel, from the rest position Pr to a so-called locking interrogation position Pv. This operation also brings about a rotational movement of the mobile member 18 about the axis A1 in the clockwise direction, as far as a stop (not depicted).

FIG. 2 depicts a perspective view of the mobile member 18 for grasping, equipped with a switching device 33 according to the invention, and FIG. 3 depicts the mobile member 18 in an exploded view.

According to the teachings of the invention, a switch module 36, of parallelepidal shape, is fixed from the front, for example by elastic insertion, in a complementary housing 38 of the front leg 30 of the mobile member 18 for grasping. This switch module 36 comprises, in its front face 37, two parallel flat slots 40, 42, of longitudinal and axial orientation, which pass through the inner face 44 of the switch module 36 and the inner face 46 of the front leg 30.

The slots 40, 42 here have different dimensions. The right-hand slot 40 extends axially outward further than the left-hand slot 42.

The switch module 36 also comprises two sensitive elements, in this instance a right-hand reed switch 48 and a left-hand reed switch 50, and a common magnet 52, which are located in one and the same transverse plane. As a preference, the common magnet 52 is located essentially mid-way between the two reed switches 48, 50.

Each reed switch 48, 50 forms, with the common magnet 52, a switch which operates without mechanical actuation. It is the magnetic field of the magnet 52 which is able to cause the switch to switch by influencing the reed switch 48 or the reed switch 50.

According to an alternative form of the embodiment (not depicted) of the invention, the switches without mechanical actuation may be of a different type and may, for example, employ Hall-effect sensitive elements.

A part 54, preferably metallic, depicted in an exploded view, comprises two screens 56, 58 in the form of two parallel plates of longitudinal and axial orientation which are designed to slide appropriately in the slots 40, 42 of the switch module 36.

The two, right-hand 56 and left-hand 58, screens are connected by their front end edge to a transverse connecting plate 60.

The two screens 56, 58 have roughly the same dimensions but are offset in the axial direction, that is to say that the right-hand screen 56 is offset outward while the left-hand screen 58 is offset inward.

The metal screens 56 and 58 and the transverse connecting plate 60 are advantageously made as a single piece of cut and bent sheet metal.

According to the preferred embodiment of the invention, an antenna 62 is incorporated into the mobile member 18 for grasping and the electrical wires 64 connecting the antenna 62 are connected to the electrical wires 66 connecting the switch module 36, to form one single wiring harness 68.

In the longitudinal section view of FIG. 4, a handle is depicted in the rest position.

The metal screens 56, 58 are fixed by their transverse connecting plate 60 to the transverse rear face 70 of the handle endpiece 34, in this instance using a screw 72.

FIG. 5 shows the position of the screens 56, 58 on the handle endpiece 34.

Figure 7:
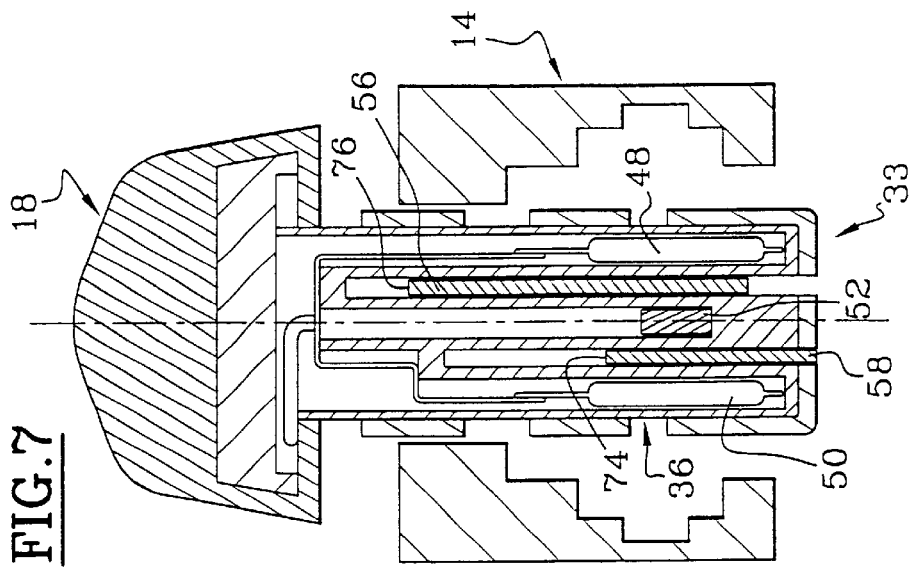
FIG. 7 is a view in section on the plane of section 7—7 of FIG. 6, depicting the switching device of FIG. 6.
Figure 6:
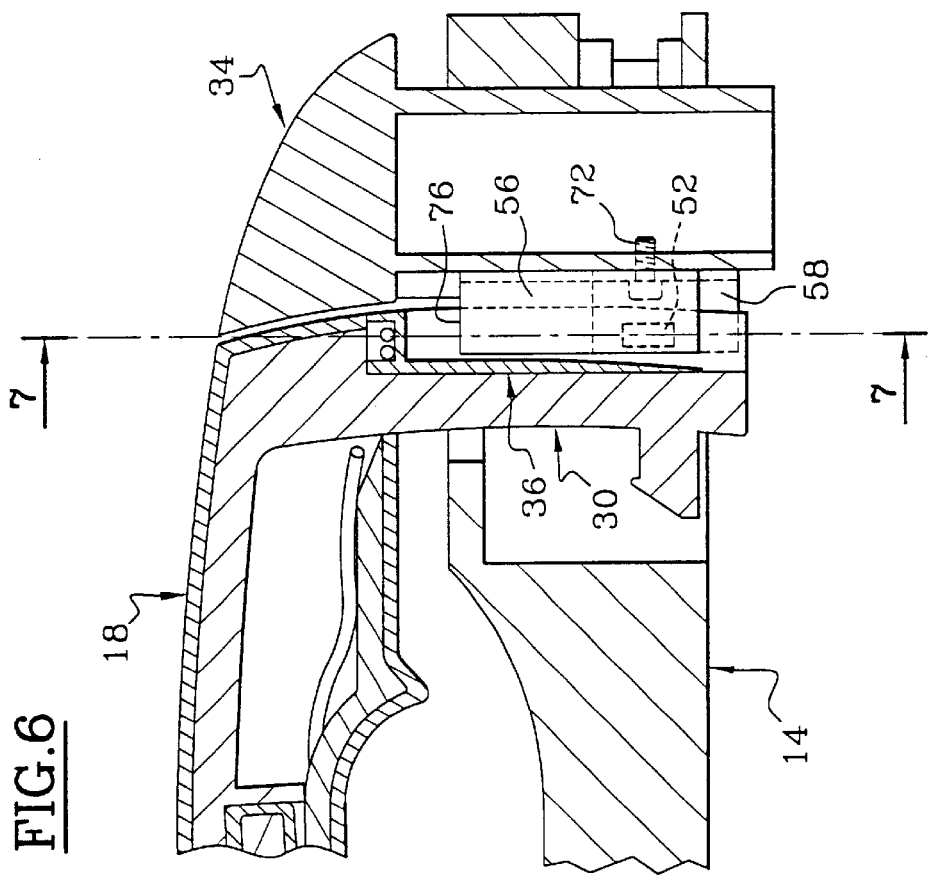
FIG. 6 is an enlarged partial view depicting the right-hand end of the mobile member for grasping of FIG. 4 in the rest position.

The device of the invention can be depicted in detail in longitudinal and transverse section in FIGS. 6 and 7 respectively.

FIG. 7 more particularly shows the relative position of the elements of the switching device 33 in the rest position Pr.

The common magnet 52, which is located mid-way between the two reed switches 48, 50, does not, via its magnetic field, influence the right-hand 48 and left-hand 50 reed switches because the right-hand metal screen 56 is inserted transversely between the right-hand reed switch 48 and the common magnet 52, and the left-hand metal screen 58 is inserted between the left-hand reed switch 50 and the common magnet 52.

Figure 9:
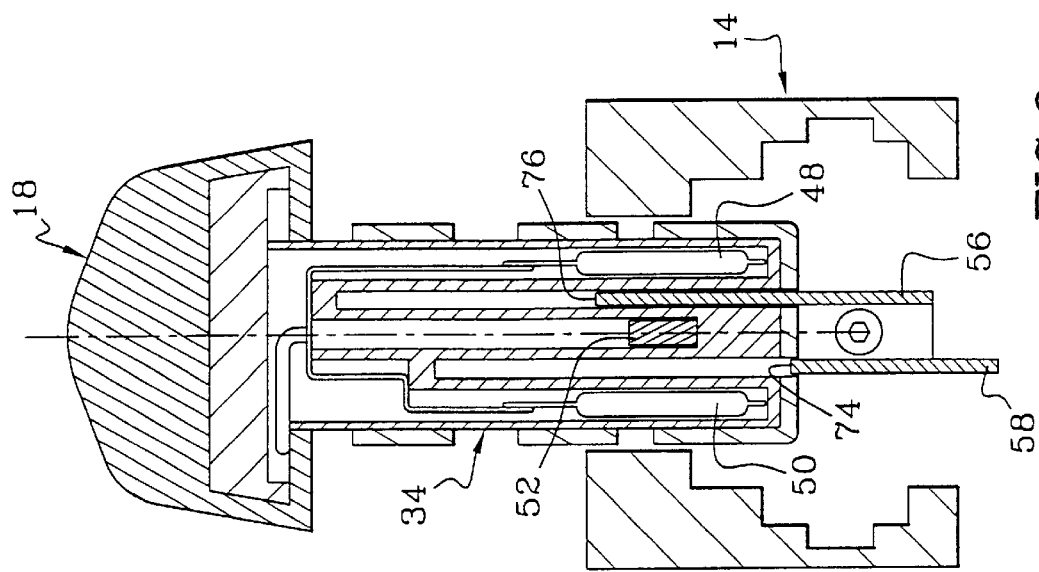
FIG. 9 is a view similar to that of FIG. 7, depicting the switching device on the plane of section 9—9 of FIG. 8.
Figure 8:
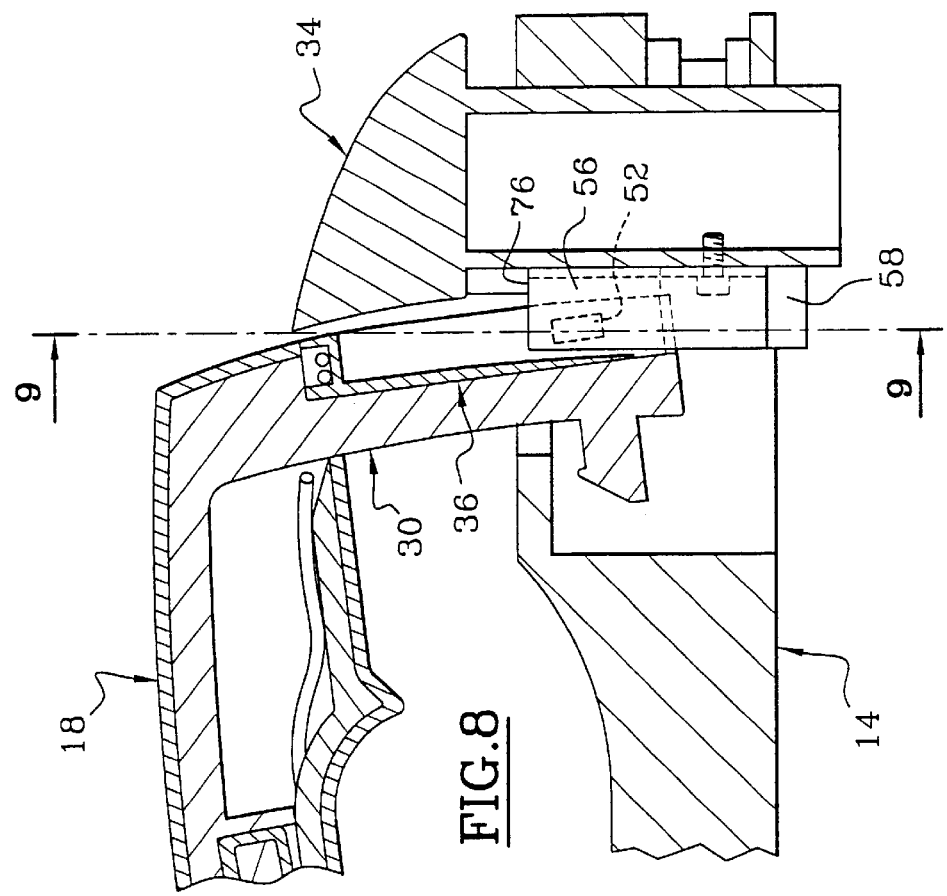
FIG. 8 is a view similar to that of FIG. 6 depicting the mobile member for grasping in the unlocking interrogation position.

FIGS. 8 and 9 show the mobile member 18 for grasping in the unlocking interrogation position Pd. In this position Pd, the user is pulling the mobile member 18 outward and this is causing outward axial movement of the front leg 30 of the mobile member 18, and therefore outward movement of the switch module 36 with respect to the endpiece 34 and with respect to the fixed screens 56 and 58 which move along their respective slots 40 and 42.

As the magnet 52 and the reed switches 48, 50 form part of the switch module 36, they move outward. When the mobile member 18 comes up close to its outer stop, as the outer edge 74 of the left-hand screen 58 does not extend outward as far as the outer edge 76 of the right-hand screen 56, the left-hand screen 58 is no longer inserted between the left-hand reed switch 50 and the common magnet 52. The left-hand reed switch 50 is therefore influenced by the common magnet 52, which causes it to switch and trigger the unlocking interrogation Id.

FIGS. 10 and 11 are similar to FIGS. 8 and 9 and depict the mobile member 18 for grasping in the locking interrogation position Pv. In this position Pv, the user is pushing the mobile member 18 inward, causing the inward movement of the front leg 30 of the mobile member 18 and therefore the inward movement of the switching module 36 with respect to the fixed screens 56 and 58.

When the mobile member 18 comes up close to its inner stop, the right-hand reed switch 48 is influenced by the common magnet 52 because the inner edge 78 of the right-hand screen 56 does not extend inward as far as the inner edge 80 of the left-hand screen 58, and the right-hand screen 56 is no longer inserted between the right-hand reed switch 48 and the common magnet 52. This causes the right-hand reed switch 48 to switch and therefore trigger the locking interrogation Iv.

In FIG. 11, it will be noted that the right-hand screen 56 is partially concealing the common magnet 52 from the right-hand reed switch 48. However, given the switching characteristics of reed switches, all that is required is for the right-hand screen 56 to reveal the common magnet 52 to the right-hand reed switch 48, even to a small extent, for this switch to switch.

It will be noted that the mobile member 18 for grasping has, of course, to reach the inner stop before the outer edge 74, 76 the screen 56, 58 comes into contact with the outer axial closed end 82, 84 of a slot 40, 42. If this were not the case, there would be a risk of damaging the metal part 54 comprising the screens 56, 58 and/or the switch module 36, these not being intended in this instance to act as stops.

According to an alternative form of embodiment (not depicted) of the invention, the switch module 36 is fixed to the transverse rear face 70 of the handle endpiece 34 and the two screens 56, 58 are fixed on the front face of the front leg 30 of the mobile member 18 for grasping. Thus, the system operates according to the same principle but in reverse, the screens 56, 58 being able to move with respect to the fixed switch module 36.

According to this alternative form of embodiment, the antenna 62 can also be placed in the handle endpiece 34, for example by overmolding, so that the wires 66 for electrical connection of the switch module 36 and those 64 for the antenna 62 can be joined to form one single wiring harness 68.

According to another alternative form of embodiment (not depicted), the two sensitive elements 48, 50 may be superposed in the axial direction and just one screen of appropriate shape, for example equipped with one or more openings, is inserted selectively between the sensitive elements 48, 50 and the common magnet 52 so as to bring about the locking interrogation Iv or unlocking interrogation Id according to the pivoting of the mobile member 18 for grasping and the axial movement of the screen with respect to the sensitive elements 48, 50.

According to yet another alternative form of embodiment (not depicted) of the invention, the switch module 36 may comprise two magnets, one to the right of the right-hand reed switch 48 and the other to the left of the left-hand reed switch 50, but whose slots 40, 42 are each made between a magnet and an associated reed switch 48, 50.

This type of assembly requires a third screen fixed in the switch module 36 between the two reed switches to prevent one magnet from being able simultaneously to influence both reed switches 48, 50.

Figure 12:
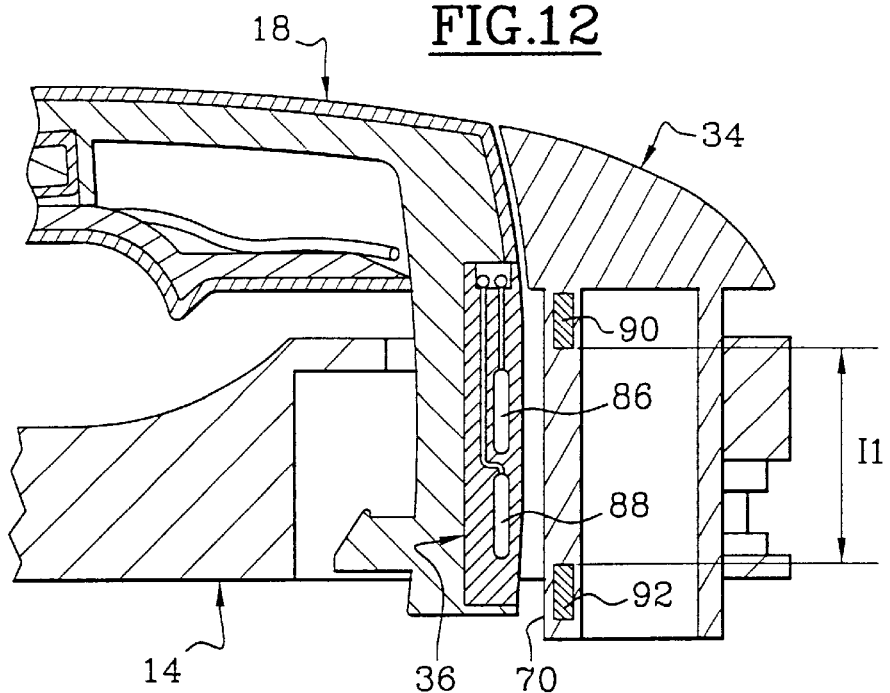
FIG. 12 is view similar to that of FIG. 6 depicting a second embodiment of the invention in which the switching device comprises two superposed sensitive elements borne by the mobile member for grasping and two fixed magnets, and which is depicted in the rest position.
Figure 13:
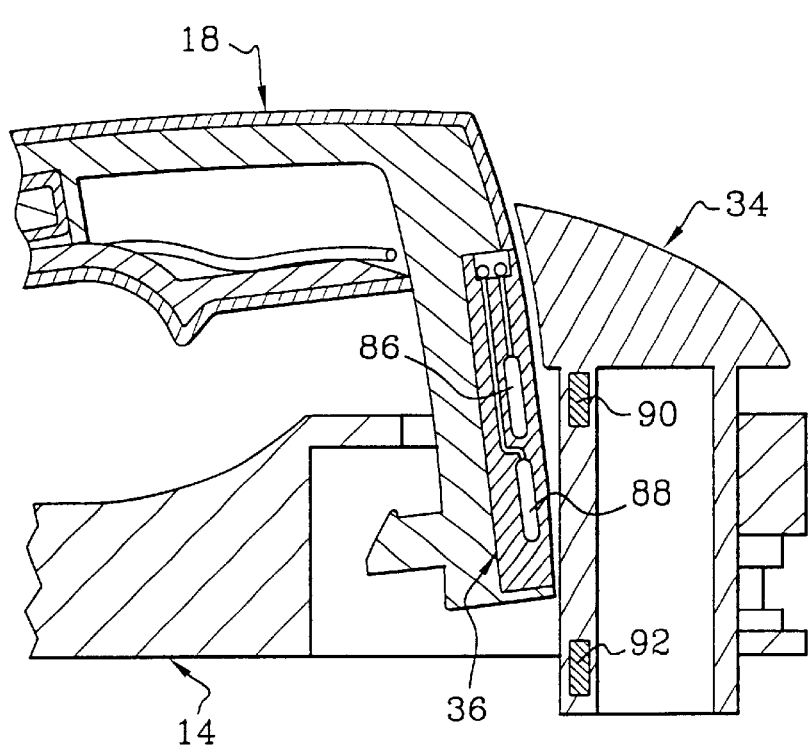
FIG. 13 is a view similar to that of FIG. 12 depicting the switching device in the unlocking interrogation position.

FIGS. 12, 13 and 14 depict a second, simplified, embodiment of the invention, in which screens are not used.

According to this embodiment, the switch module 36 comprises two sensitive elements 86, 88 superposed in the axial direction, in this instance an outer reed switch 86 and an inner reed switch 88.

An outer magnet 90 and an inner magnet 92, which are fixed, and separated by a gap I1 in the axial direction, are incorporated into the rear transverse face 70 of the handle endpiece 34, for example by overmolding. These two magnets 90, 92 in this instance are contained in the same axial and longitudinal plane as the outer reed switch 86 and the inner reed switch 88, that is to say in the plane of section of FIGS. 12 to 14.

By way of an alternative, each switch and associated magnet pair may be located in a plane which is laterally offset from that of the other pair.

In the rest position Pr depicted in FIG. 12, the reed switches 86, 88 lie opposite the gap I1, so that they cannot be influenced by the magnetic fields of the magnets 90, 92.

In the unlocking interrogation position Pd depicted in FIG. 13, the switch module 36 moves outward as described earlier. When the mobile member 18 for grasping approaches its outer stop, the outer reed switch 86 finds itself essentially opposite the outer magnet 90. The latter therefore causes the outer reed switch 86 to switch and therefore causes unlocking interrogation Id, without the inner reed switch 88 switching.

Similarly, in the locking interrogation position Pv depicted in FIG. 14, the switch module 36 moves inward. When the mobile member 18 for grasping approaches its inner stop, the inner reed switch 88 finds itself roughly opposite the inner magnet 92. The latter therefore causes the inner reed 88 to switch and therefore brings about the locking interrogation Iv, without the outer reed switch 86 switching.

Another embodiment of the invention is depicted in FIG. 15. According to this embodiment, the handle endpiece 34 comprises a fixed common magnet 94 located, when the handle is in the rest position Pr, mid-way between two sensitive elements 86, 88 borne by a switch module 36, in this instance an outer reed switch 86 and an inner reed switch 88. The two reed switches 86, 88 are separated by a gap I2 in the axial direction.

In an operation similar to that of the switching device according to the preferred embodiment of the invention, when the handle is in the rest position Pr, as depicted in FIG. 15, no reed switch 86, 88 is influenced by the magnetic field of the common magnet 94 and this magnet is opposite the gap I2.

In the unlocking interrogation position Pd (not depicted), the inner reed switch 88 is opposite the common magnet 94, which causes it to switch and brings about the unlocking interrogation Id.

In the locking interrogation position Pv (not depicted), the outer reed switch 86 is opposite the common magnet 94, which causes it to switch and brings about the locking interrogation Iv.

According to an alternative form of embodiment of the invention, mechanical or electromagnetic indexing means are provided to determine, in particular, the rest position Pr of the mobile member 18 for grasping with respect to the fixed support 14.

What is claimed is:

1. A security system for a motor vehicle opening leaf comprising a bodywork panel with an external face and movable between a closed position and an open position, said security system comprising:

a lock for maintaining the opening leaf in the closed position, a handle for operating the lock, the handle arranged on the external face of the bodywork panel of the opening leaf and comprising a pivotal mobile member for grasping and a fixed support, said pivotal mobile member being movable relative to the fixed support; and an interrogation device to trigger interrogation for authorization for permitting movement of the bodywork panel between the closed position and the open position, said interrogation device comprising an antenna and further comprising first and second switches built into said handle for activating an unlocking interrogation (Id) and a locking interrogation (Iv) by movement of said pivotal mobile member of said handle relative to said fixed support without other mechanical actuation.

2. The security system as claimed in claim 1, wherein said interrogation device further comprises at least one magnet, and wherein said first and second switches comprise first and second sensitive elements, respectively, said sensitive elements each comprising a member selected from a reed switch and a Hall effect switch for switching when said magnet occupies a predetermined position with respect to said sensitive element.

3. The security system as claimed in claim 2, wherein:

said at least one magnet and said first and second sensitive elements are carried in either said pivotal mobile member or said fixed support;

said interrogation device further comprises at least one metal screen carried in either said pivotal mobile member or said fixed support and associated with said first and second switches for insertion between said at least one magnet and a corresponding one of said first and second sensitive elements; and relative movement of said pivotal mobile member causes one or the other of said first and second sensitive elements to switch and trigger said unlocking interrogation (Id) or said locking interrogation (Iv).

4. The security system as claimed in claim 1, wherein:

said first and second switches respectively comprise first and second sensitive elements;

said interrogation device further comprises a first magnet, a second magnet, a first screen insertable selectively between said first magnet and said first sensitive element, a second screen insertable selectively between said second magnet and said second sensitive element, and a third screen inserted between said first and second magnets for preventing said first and second magnets from interacting with said second and first sensitive elements, respectively;

said first and second sensitive elements and said first and second magnets are carried in either said pivotal mobile member or said fixed support;

said pivotal mobile member rests in a rest position (Pr), in which said first screen is inserted between said first magnet and said first sensitive element and in which said second screen is inserted between said second magnet and said second sensitive element;

said pivotal mobile member is movable into an unlocking interrogation position (Pd) for triggering said unlocking interrogation (Id), in which said first screen is not inserted between said first magnet and said first sensitive element for causing said first sensitive element to switch; and said pivotal mobile member is movable into a locking interrogation position (Pv), for triggering said locking interrogation (Iv), in which said second screen is not inserted between said second magnet and said second sensitive element for causing said second sensitive element to switch.

5. The security system as claimed in claim 4, wherein in said unlocking interrogation position said second screen remains inserted between said second magnet and said second sensitive element for preventing switching of said second sensitive element, and wherein in said locking interrogation position said first screen remains inserted between said first magnet and said first sensitive element for preventing switching of said first sensitive element.

6. The security system as claimed in claim 3, wherein:

said at least one magnet comprises a common magnet, with said first and second sensitive elements arranged one opposite sides of said common magnet;

said at least one metal screen comprises first and second screens parallel to one another, said first screen insertable selectively between said first sensitive element and said common magnet and said second screen insertable selectively between said second sensitive element and said common magnet;

said pivotal mobile member rests in a rest position (Pr), in which said first screen is inserted between said common magnet and said first sensitive element and in which said second screen is inserted between said common magnet and said second sensitive element;

said pivotal mobile member is movable into an unlocking interrogation position (Pd) for triggering said unlocking interrogation (Id), in which said first screen is not inserted between said common magnet and said first sensitive element for causing said first sensitive element to switch; and said pivotal mobile member is movable into a locking interrogation position (Pv), for triggering said locking interrogation (Iv), in which said second screen is not inserted between said common magnet and said second sensitive element for causing said second sensitive element to switch.

7. The security system as claimed in claim 6, wherein in said unlocking interrogation position said second screen remains inserted between said common magnet and said second sensitive element for preventing switching of said second sensitive element, and wherein in said locking interrogation position said first screen remains inserted between said common magnet and said first sensitive element for preventing switching of said first sensitive element.

8. The security system as claimed in claim 6, wherein said first and second sensitive elements face one another in a path in which said pivotal mobile member travels during movement, and wherein said first and second screens are offset from said path.

9. The security system as claimed in claim 3, further comprising a switching module carrying said at least one magnet and said first and second sensitive elements.

10. The security system as claimed in claim 9, wherein:

said at least one metal screen comprises first and second screens;

said switching module comprises first and second slots;

said first slot extends between said at least one magnet and said first sensitive element for permitting said first screen to be inserted between said at least one magnet and said first sensitive element; and said second slot extends between said at least one magnet and said second sensitive element for permitting said second screen to be inserted between said at least one magnet and said second sensitive element.

11. The security system as claim in claim 2, wherein said at least one magnet is carried by one of said pivotal mobile member and said fixed support, and wherein said first and second sensitive elements are carried by the other of said pivotal mobile member and said fixed support.

12. The security system as claimed in claim 11, wherein:

said at least one magnet comprises first and second magnets carried by said one of said pivotal mobile member and said fixed support, said first and second magnets being separated by a gap in a path of movement of said pivotal mobile member;

said first and second sensitive elements are offset from said path;

said pivotal mobile member rests in a rest position (Pr), in which said first and second sensitive elements are located facing said gap and are not switched;

said pivotal mobile member is movable into an unlocking interrogation position (Pd) for triggering said unlocking interrogation (Id), in which said first sensitive element faces said first magnet and switches, and said second sensitive element faces said gap; and said pivotal mobile member is movable into a locking interrogation position (Pv), for triggering said locking interrogation (Iv), in which said first sensitive element faces said gap and said second sensitive element faces said second magnet and switches.

13. The security system as claimed in claim 11, wherein:

said at least one magnet comprises a common magnet;

said first and second sensitive elements are separated by a gap in a path of movement of said pivotal mobile member;

said pivotal mobile member rests in a rest position (Pr), in which said common magnet is located facing said gap and said first and second switching elements are not switched;

said pivotal mobile member is movable into an unlocking interrogation position (Pd) for triggering said unlocking interrogation (Id), in which said common magnet faces said second sensitive element which switches; and said pivotal mobile member is movable into a locking interrogation position (Pv), for triggering said locking interrogation (Iv), in which said common magnet faces said first sensitive element which switches.

14. The security system as claimed in claim 1, wherein said pivotal mobile member is pivotal outward along an unlocking travel path and pivotal inward along a locking travel path.

15. The security system as claimed in claim 1, wherein said antenna is incorporated into said pivotal mobile member.

16. The security system as claimed in claim 2, wherein:

said antenna and said first and second sensitive elements are carried by said pivotal mobile member or by said fixed support; and said security system further comprises a harness common to said antenna and said first and second sensitive elements.

* * * * *